(12) United States Patent
Nakamoto

(10) Patent No.: US 6,385,961 B2
(45) Date of Patent: May 14, 2002

(54) PURGING AIR SUPPLY SYSTEM FOR A GAS TURBINE

(75) Inventor: Yukimasa Nakamoto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/781,420

(22) Filed: Feb. 13, 2001

Related U.S. Application Data

(62) Division of application No. 09/305,459, filed on May 6, 1999.

(30) Foreign Application Priority Data

| May 8, 1998 | (JP) | ............................................ 10-126039 |
| May 8, 1998 | (JP) | ............................................ 10-126040 |
| May 11, 1998 | (JP) | ............................................ 10-127347 |
| May 12, 1998 | (JP) | ............................................ 10-128938 |

(51) Int. Cl.$^7$ .................................................. F02G 3/00
(52) U.S. Cl. ................................................. 60/39.094
(58) Field of Search ........................... 60/39.094, 728, 60/734, 39.83

(56) References Cited

U.S. PATENT DOCUMENTS

| 4,645,415 A | * | 2/1987 | Hovan et al. ................ 415/115 |
| 5,553,448 A | * | 9/1996 | Farrell et al. ............. 60/39.161 |
| 6,050,080 A | * | 4/2000 | Horner ....................... 60/39.07 |
| 6,119,445 A | * | 9/2000 | Bronicki et al. ........... 60/39.02 |
| 6,145,294 A | * | 11/2000 | Traver et al. .............. 60/39.02 |

FOREIGN PATENT DOCUMENTS

| DE | 3810987 A1 | 10/1988 |
| GB | 2 035 540 A | 6/1980 |
| JP | 56-104122 | 8/1981 |
| JP | 60 104728 A | 10/1985 |
| JP | 8-178290 | 7/1996 |

\* cited by examiner

*Primary Examiner*—Timothy S. Thorpe
*Assistant Examiner*—William H Rodriguez
(74) *Attorney, Agent, or Firm*—Wenderoth, Lind & Ponack, L.L.P.

(57) ABSTRACT

A plurality of fuel nozzles $X_1$ and $X_2$ in combustor X are supplied with fuel gas from a fuel gas system and fuel oil from a fuel oil system, respectively. Gas turbine operation is performed with fuel being changed over to either gas or oil. Fuel oil distribution control system A controls oil flowing into a plurality of fuel pipings. When oil is changed over to gas, fuel oil purge system B is supplied with air of an appropriate temperature and pressure from purging air supply system C. This air flows into fuel oil pipings and nozzles $X_2$ for purging residual oil therein. Fuel nozzle wash system D is supplied with water by-passing from a wash water tank for compressor washing. This water flows through nozzles $X_2$ for washing thereof.

11 Claims, 12 Drawing Sheets

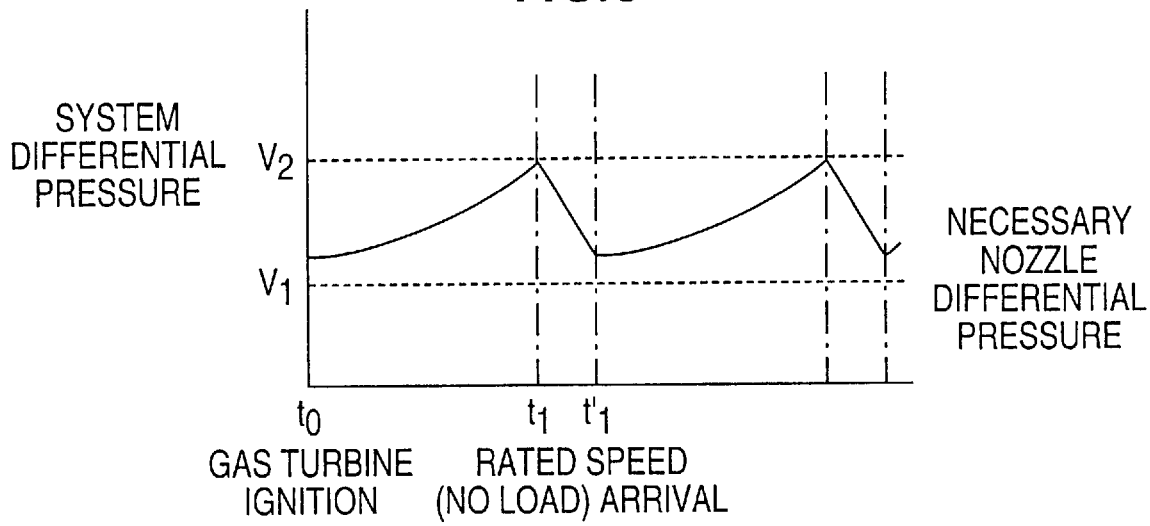
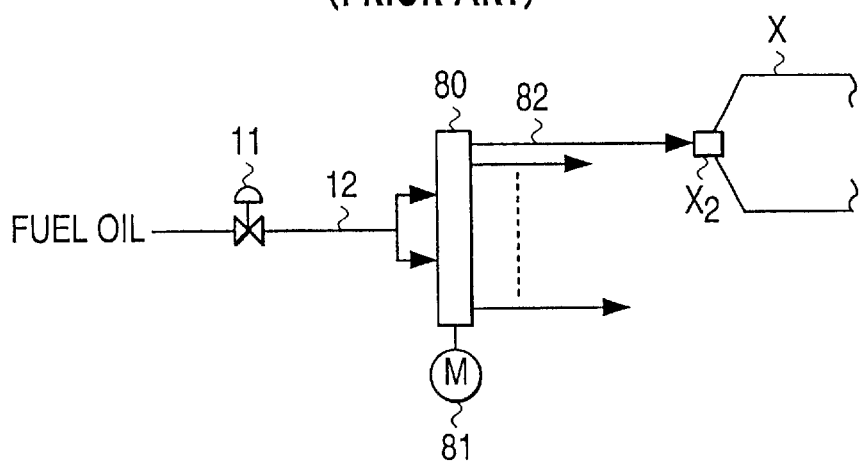

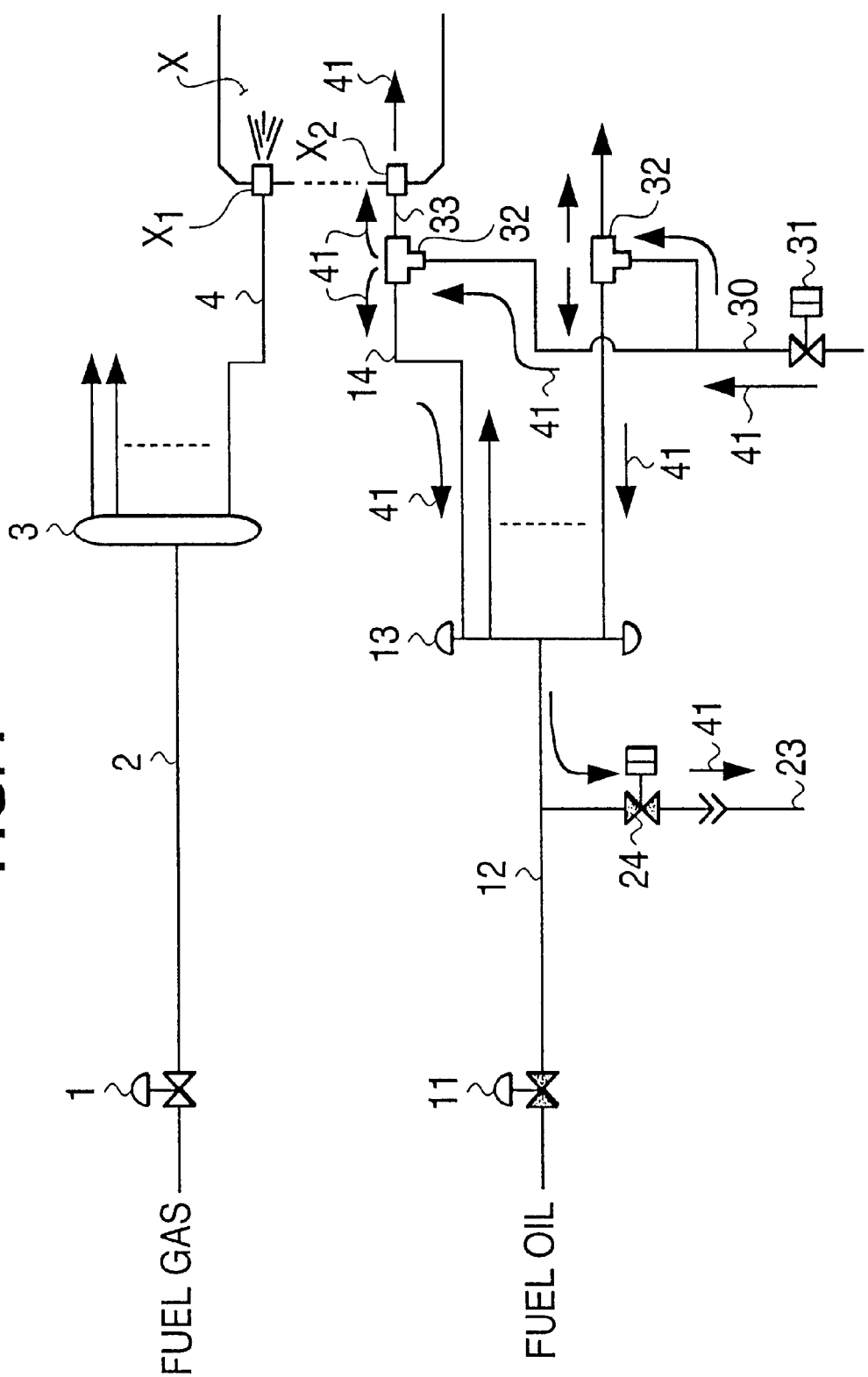

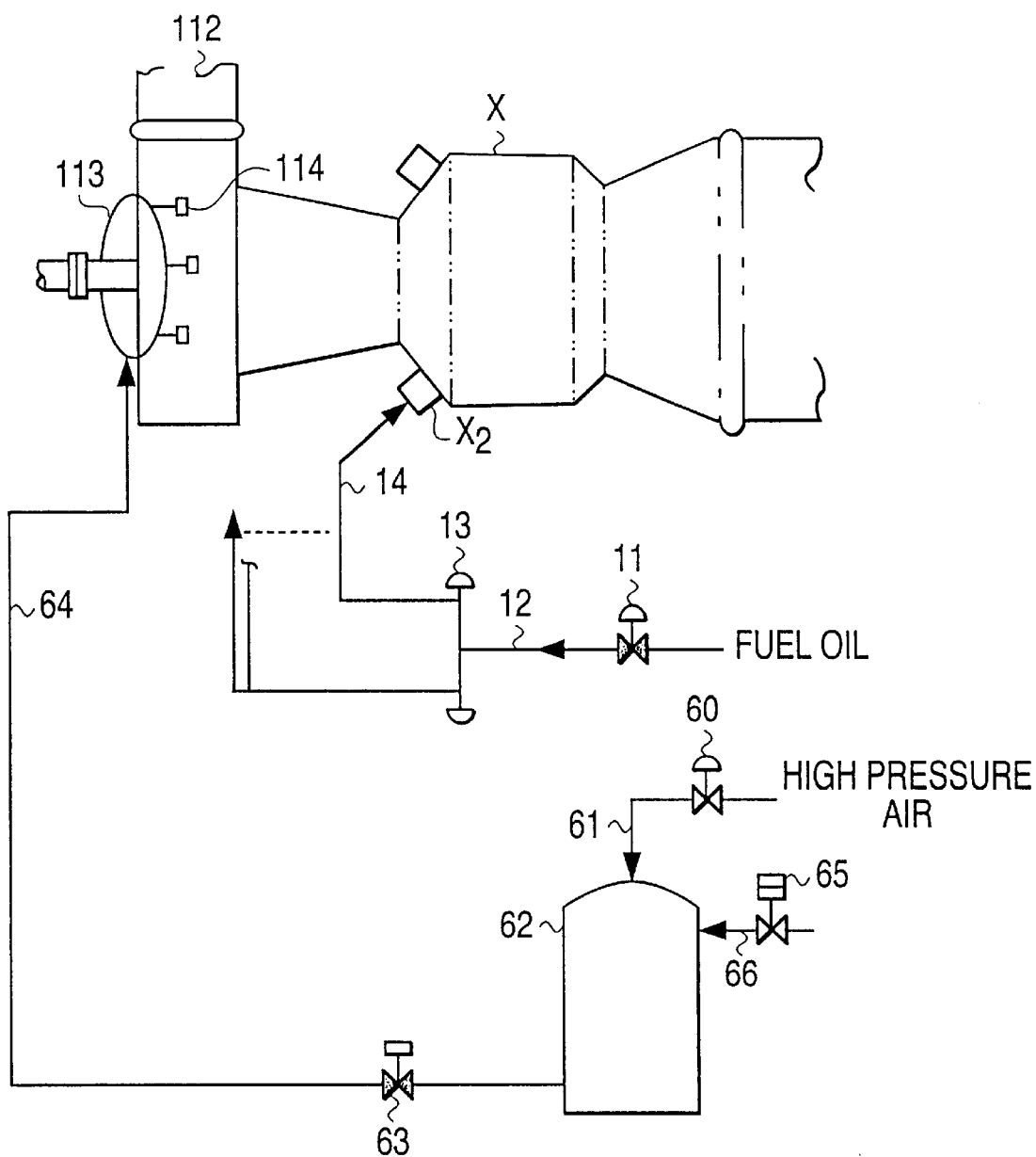

PURGING AIR SUPPLY SYSTEM FOR A GAS TURBINE

This is a Divisional Application of prior U.S. patent application Ser. No. 09/305,459, filed May 6, 1999.

BACKGROUND OF THE INVENTION

1. Field of the Invention

The present invention relates generally to a gas turbine fuel system and more specifically to a gas turbine fuel system comprising a fuel oil distribution control system, a fuel oil purge system, a purging air supply system and a fuel nozzle wash system in which, fuel oil distribution is controlled to be done uniformly to a plurality of fuel nozzles with enhanced reliability of fuel distribution, and residual oil in fuel pipings and nozzles, when gas turbine operation is changed over to gas fuel from oil fuel, is purged effectively so that a load change caused by burning of the residual oil at the time of purging is prevented.

2. Description of the Prior Art

FIG. 9 is a block diagram-of an entire gas turbine fuel system comprising therein a fuel oil supply system, a fuel oil purge system, a purging air supply system and a compressor outlet wash system in the prior art. In FIG. 9, a combustor X comprises therein a plurality, about 20 pieces for example, of fuel nozzles $X_1$, $X_2$ disposed along an inner periphery thereof. The fuel nozzles $X_1$ are supplied with fuel gas from a fuel gas supply system and the fuel nozzles $X_2$ are supplied with fuel oil from a fuel oil supply system G. The gas and oil are changed over to either one thereof to be supplied into the combustor X for combustion. The fuel oil supply system G, as mentioned, is a system for supplying therethrough fuel oil and a fuel oil purge system H is a system for purging oil remaining in the piping system or fuel nozzles when the fuel is changed over to gas from oil. A purging air supply system J supplies therethrough a purging air into the fuel oil purge system H. A compressor outlet wash system K is a system for injecting water into a compressor outlet for washing this compressor outlet which communicates with the combustor. Description will be made further on each of the above systems.

The fuel oil supply system G will be described first. In the gas turbine, a stable combustion is required for a wide range of fuel flow rates from ignition to power output. Especially, in the low fuel flow rate range at the time of ignition etc., there is only a small differential pressure of the fuel nozzles in the combustor, which results in an unstable combustion. In recent gas turbines there are provided a large number of fuel nozzles, of about 20 pieces, and there arises an imbalance in the fuel flow rate due to the influence of the head difference between upper ones and lower ones of the fuel nozzles, which are vertically disposed. For this reason, a flow divider is provided so that fuel is divided to be supplied uniformly to each of the fuel nozzles. But this flow divider is not necessarily of a sufficient reliability, and troubles in the fuel system are thereby often caused.

FIG. 10 is a diagrammatic view of the fuel oil supply system G in the prior art. In FIG. 10, fuel oil is flow rate controlled by a flow control valve 11 to then flow through a piping 12 and enter a flow divider 80 to be divided there to flow through a plurality of pipings 82 of about 20 pieces and to be supplied into each of the fuel nozzles $X_2$ of the combustor X. The gas turbine fuel nozzles $X_2$ are disposed in about 20 pieces along a circumference and there is a head difference of about 4 m between the nozzles of upper positions and those of lower positions. This head difference produces an imbalance in the fuel flow rate, especially in the low fuel flow rate range at the time of ignition. For this reason, the flow divider 80 is provided, but this flow divider 80 is constructed such that a spiral shaft is disposed in a cylindrical body, and while this shaft is rotated, fuel oil flows into the cylindrical body to be divided to flow through each of the plurality of pipings 82 uniformly. A motor 81 is operated only during the operation start time for ensuring a smooth start of rotation of the flow divider 80.

FIG. 11 is a view showing a relation between load transition (fuel flow rate) and system differential pressure in the prior art gas turbine, wherein as load increases, fuel flow rate increases from gas turbine ignition time $t_0$ to rated speed (no load) arrival time $t_1$, and further to time $t_2$ when the system differential pressure, including nozzle differential pressure, comes to a necessary nozzle differential pressure $V_1$. That is, during the time T from $t_0$ to $t_2$, the system differential pressure does not reach the necessary nozzle differential pressure $V_1$, but reaches $V_2$ at time $t^2$ to increase more thereafter. Accordingly, the nozzle differential pressure is low during the time shown by T, and if there is a head difference between the plurality of fuel nozzles, there occurs an imbalance of fuel flow rates between each of the fuel nozzles, hence the flow divider 80 is operated so that the imbalance of the fuel oil between each of the fuel nozzles may be eliminated. But this flow divider 80 has a very small gap between the inner rotational body and the stationary portion for its function, and this makes control of foreign matter difficult and has often been a cause of trouble in the fuel system.

Next, the fuel oil purge system H will be described. FIG. 12 is a diagrammatic view of the fuel oil purge system in the prior art at the time when the gas turbine fuel is changed over. In FIG. 12, numeral 1 designates a flow control valve in a fuel gas system, numeral 2 designates a piping therefor, numeral 3 designates a fuel gas distributor, which distributes the fuel gas to the plurality of fuel nozzles $X_1$ and numeral 4 designates a plurality of pipings, which supply therethrough the fuel gas from the fuel gas distributor 3 to the respective fuel nozzles $X_1$.

Numeral 11 designates a flow control valve in a fuel oil system, numeral 12 designates a piping therefor, numeral 13 designates a header, which distributes the fuel oil from the piping 12 to the plurality of fuel nozzles $X_2$ and numeral 14 designates a plurality of pipings, which are connected to the header 13 and supply therethrough the fuel oil distributed by the header 13 to the respective fuel nozzles $X_2$. Numeral 26 designates a purging air system piping, numeral 25 designates an opening/closing valve, numeral 23 designates a drain valve piping and numeral 24 designates an opening/closing valve therefor. Combustor X comprises therein the fuel nozzles $X_1$, $X_2$.

In the mentioned system so constructed, while the operation is done with the fuel oil being burned, the fuel oil flowing through the flow control valve 11 and the piping 12 is distributed by the header 13 to flow through the plurality of pipings 14 to the respective fuel nozzles $X_2$. The fuel oil so distributed is injected into the combustor X from the fuel nozzles $X_2$ for combustion.

When the operation is done with the fuel being changed over to gas from oil, the flow control valve 11 is closed and the fuel gas is led instead into the piping 2 to be supplied to the fuel nozzles $X_1$ through the fuel gas distributor 3 and the piping 4. In this case, the previous fuel oil remains as it is in the pipings 12, 14, and this fuel oil, if left there, is carbonized to stick there, with a fear of causing blockage of the pipings and nozzles. Hence, it is necessary to remove such residual oil when the fuel is changed over to gas.

Thus, the opening/closing valve 25 is opened so that purging air 40 is led into the piping 12 from the purging air system piping 26. The purging air 40 enters the header 13 through the piping 12 to then flow through the pipings 14 to the fuel nozzles $X_2$ to be blown into the combustor X. Thereby, the fuel oil which remains in the piping 12, header 13, pipings 14 and fuel nozzles $X_2$ is all discharged into the combustor X. This purging of the residual oil is done while the operation is continued with the fuel gas being supplied and burned in the combustor X. But there is a considerable quantity of such residual oil itself in the piping 12, header 13, pipings 14 and fuel nozzles $X_2$, and also there are provided a large number of the fuel nozzles $X_2$, and the same number of the pipings 14 connected to the respective fuel nozzles $X_2$. Accordingly, if the residual oil in these portions is all discharged into the combustor X and the operation is continued with the fuel gas so changed over, then the fuel oil so discharged into the combustor X burns so that the fuel increases beyond a planned supply value, which elevates the combustion temperature to cause a large load change. Hence, realization of a fuel oil purge system which does not cause such a load change has long been desired.

Next, the purging air supply system J will be described. In the recent gas turbine, there is realized an operation system wherein fuel is changed over to gas from oil, as mentioned above. This operation system comprises both the fuel oil system, and fuel gas system and it is necessary to purge fuel pipings and nozzles on the side not used. Especially in the fuel oil system, oil remains in the pipings and, if left as it is, is carbonized to stick there, and there is a fear of blockage of the pipings and nozzles.

FIG. 13 is a diagrammatic view of the purging air supply system J in the prior art gas turbine. In FIG. 13, numeral 110 designates a gas turbine, numeral 42 designates piping for taking out therethrough outlet air of an air compressor and numeral 90 designates an air cooler, which comprises therein a multiplicity of tubes communicating with the piping 42. Numeral 91 designates a motor for rotating a fan 92 to thereby supply air to the air cooler 90 and numeral 43 designates piping connecting to outlet of the air cooler 90. Numeral 93 also designates piping, which diverges from the piping 42 for obtaining air of the purge system, and numeral 94 designates a cooler using water 95 for cooling the air from the piping 93. Numeral 96 designates piping connected to an outlet of the cooler 94, numeral 97 designates a drain separator, numeral 98 designates piping connected to outlet of the drain separator 97, numeral 53 designates a pressure elevation compressor and numeral 99 designates piping connected to an outlet of the pressure elevation compressor 53. Numeral 100 designates a cooling using water 101 for cooling the air which has been heated to a high temperature by pressure elevation at the pressure elevation compressor 53 to an appropriate temperature as fuel nozzle purging air. Numeral 48 designates piping for supplying therethrough the air which has been cooled to the appropriate temperature as the purging air at the cooler 100.

In the mentioned system so constructed, the air of the compressor outlet of about 400° C. is cooled at the air cooler 90 to about 200° C. to 250° C. to be supplied into the gas turbine 110 as rotor cooling air through the piping 43. A portion of the air of the compressor outlet diverges from the piping 42 and is led into the cooler 94 through the piping 93 to be cooled to about 130° C. to then be sent to an inlet of the pressure elevation compressor 53. This air is removed of drainage by the drain separator 97 disposed between the pipings 96 and 98. Then the air is compressed to a predetermined pressure at the pressure elevation compressor 53 and its temperature is also elevated to about 200° C. This air of about 200° C. is led into the cooler 100 through the piping 99 to be cooled to about 150° C., which is appropriate for purging, and is then supplied to each of the fuel systems through the piping 48 as the purging air.

Thus, in the purging air supply system, as the inlet temperature of the pressure elevation compressor 53 becomes high, there is provided the cooler 94 for cooling the compressor outlet air of about 400° C. to about 100° C. to 130° C. Also, as the air, when compressed at the pressure elevation compressor 53, is heated to about 200° C., it is cooled again at the cooler 100 to about 150° C. In this kind of system, therefore, there are needed the coolers 94, 100 or the like, which requires large facilities and space therefor. Hence, it has been needed to improve these shortcomings and to attain cost reduction.

Next, the compressor outlet washing system K will be described. FIG. 14 is a diagrammatic view of the compressor outlet wash system in the prior art. In FIG. 14, letter X designates a combustor, numeral 112 designates a compressor outlet and numeral 113 designates a manifold for distributing wash water in an annular form, as described later. Numeral 114 designates a plurality of wash nozzles, which are provided along a periphery of the manifold 113 for injecting therefrom wash water into the compressor outlet 112. Numeral 11 designates a flow control valve for fuel oil, numeral 12 designates a piping and numeral 13 designates a header for distributing fuel into a plurality of fuel supply pipings 14. Fuel oil is supplied from the respective fuel supply pipings 14 to a plurality of fuel nozzles $X_2$.

Numeral 60 designates an air control valve for leading a high pressure air into a wash tank 62 via a piping 61. The wash tank 62 stores therein the wash water for washing the interior of the compressor outlet 112. Numeral 63 designates an opening/closing valve, through which the wash water flows to be supplied into the manifold 113 via piping 64. The wash water supplied into the manifold 113 is injected from the plurality of wash nozzles 114 into the surrounding area for washing the interior of the compressor outlet 112. Numeral 65 designates an opening/closing valve and numeral 66 designates piping for supplying therethrough the wash water in a necessary quantity into the wash tank 62.

In the gas turbine compressor outlet wash system so constructed, when the compressor outlet 112 is to be washed, the air control valve 60 is opened and the high pressure air is led into the wash tank 62 via the piping 61 so that the interior of the wash tank 62 is pressurized. Then, the opening/closing valve 63 is opened and the wash water is supplied into the manifold 113 via the piping 64. The wash water is injected from the wash nozzles 114 for washing the interior of the compressor outlet 112.

On the other hand, as for the gas turbine operation, fuel oil is led into the header 13 via the flow control valve 11 and the piping 12 to be distributed there to flow into the plurality of fuel supply pipings 14 uniformly and is then supplied into the respective fuel nozzles $X_2$ for combustion.

In the recent gas turbine, there is developed a dual fuel system in which both fuel oil and fuel gas are usable, and the fuel is changed over to gas from oil, or to oil from gas, as the case may be. In such a system, if, for example, the operation done by oil is stopped or is continued with the fuel being changed over to gas from oil, the fuel oil remaining in the fuel pipings and nozzles is carbonized to stick there, and there arises a fear of blockage of the fuel pipings and nozzles. Thus, an attempt is being made for providing large scale facilities by which the fuel pipings and nozzles are purged by air or the like. But these exclusive purging facilities require a large apparatus, which is are naturally undesirable from the viewpoint of cost reduction.

SUMMARY OF THE INVENTION

In view of the problems in the prior art gas turbine fuel system, it is a principal object of the present invention to provide a gas turbine fuel system comprising a fuel oil supply system and a fuel gas supply system so that gas turbine operation may be performed with fuel being changed over to either oil or gas and further comprising a control system in which fuel is distributed to each fuel piping of the said fuel oil supply system uniformly in an appropriate flow rate and pressure as well as a purge system in which, while gas turbine operation is with gas fuel, residual oil in the fuel oil supply system is purged effectively by air or water so that the residual oil may not be carbonized.

In order to provide the gas turbine fuel system, the present invention has objects to provide following first to fourth systems.

First is a gas turbine fuel oil distribution control system in which a control valve is employed instead of a flow divider. The control valve is constructed such that differential pressure of each fuel nozzle is elevated at the initial time of gas turbine operation. Fuel oil is distributed so as to flow into each of fuel pipings connected to fuel nozzles as uniformly as possible so that an imbalance in fuel oil flow rate caused by a head difference between each fuel nozzle is resolved and any unusual elevation of the differential pressure at the time of a high fuel flow rate is prevented.

Second is a gas turbine fuel oil purge system in which, when gas turbine operation is with fuel being changed over to gas from oil and residual oil in fuel pipings and nozzles is to be purged, the quantity of the residual oil to be discharged into a combustor is made as small as possible and the residual oil is purged securely to be discharged.

Third is a gas turbine fuel nozzle purging air supply system in which compressor outlet air of about 400° C. is cooled at a rotor cooling air cooler to an appropriate temperature to enter a pressure elevation compressor. Some coolers are thereby made unnecessary so that construction of the purging air supply system is simplified, installation space is reduced and the cost of facilities is reduced.

Fourth is a gas turbine fuel nozzle wash system in which existing gas turbine facilities may be used by being modified with a simple construction so that, when fuel is changed over to gas from oil, fuel nozzles are washed by water and residual oil in the fuel nozzles is washed out, resulting in a contribution to cost reduction of the gas turbine plant.

In order to realize the objects, the present invention provides the of following (1) to (5):

(1) A gas turbine fuel system comprises a fuel oil supply system for supplying fuel oil to a plurality of fuel nozzles and a fuel gas supply system for supplying fuel gas to the plurality of fuel nozzles so that gas turbine operation may be performed with fuel being changed over to either one of oil and gas. The system further comprises a fuel oil distribution control system for controlling flow rate and pressure of fuel oil in each of fuel pipings connecting to the fuel nozzles within a predetermined range by a control means provided in the fuel oil supply system, a fuel oil purge system provided close to the fuel nozzles in the fuel oil supply system for purging residual oil in the fuel oil supply system and fuel nozzles by air, a purging air supply system for supplying air to the fuel oil purge system, and a fuel nozzle wash system for supplying wash water to an upstream side of fuel nozzles in the fuel oil supply system connected to the fuel nozzles.

In the invention of (1) above, the fuel oil distribution control system causes fuel oil to flow into the fuel oil supply system uniformly so that any imbalance in the fuel flow rate in each of the pipings is resolved and the fuel oil purge system effectively purges the residual oil in the fuel oil supply system and fuel nozzles so that the problem of pipings being blocked by carbonization of the fuel oil is resolved. Also, the purging air supply system supplies air of an appropriate temperature into the purge system so that air supply to the purge system is ensured. Further, the fuel nozzle wash system purges the residual oil by injecting water so that reliability of purging the residual oil is enhanced. The air purge and water purge may be done by either of them being changed over to one from the other as the case may be.

(2) A gas turbine fuel oil distribution control system has a series control valve comprising a plurality of valves for controlling pressure loss in a fuel oil supply system so as to correspond to a plurality of fuel nozzles. Each of the plurality of valves is controllably driven at the same time with the same opening. A drive unit drives the series control valve. A control unit controls the drive unit, and said control unit is inputted with a system differential pressure signal and a load signal of the fuel oil supply system to put out to the drive unit a signal to throttle the series control valve approximately to an intermediate opening while the system differential pressure is a predetermined low differential pressure and a signal to open the series control valve fully for a predetermined time when said system differential pressure comes to a predetermined high differential pressure.

In the gas turbine fuel oil distribution control system of the invention of (2) above, while the series control valve is controlled in opening by the control unit and the drive unit, the control unit is inputted with a differential pressure signal and a load signal of the fuel oil supply system or the fuel nozzles to output to the drive unit a signal to throttle the series control valve approximately to an intermediate opening while the system differential pressure is a predetermined low differential pressure during the time from gas turbine ignition to rated speed arrival. In the high fuel flow rate area, when the system differential pressure comes to a predetermined high differential pressure, a signal to open the series control valve fully is output to the drive unit.

Thus, the differential pressure of each of the fuel nozzles is set to a higher differential pressure than the necessary nozzle differential pressure by the series control valve and the gas turbine operation is performed with the fuel oil being so controlled that imbalances in the fuel flow rate as so far occur in the low fuel flow rate area, are is reduced. Hence the prior art flow divider becomes unnecessary and the reliability of the fuel oil distribution is enhanced.

(3) A gas turbine fuel oil purge system in a gas turbine fuel oil supply system comprises a plurality of fuel oil supply pipings for supplying fuel oil to a plurality of fuel nozzles via a header. A drain piping is connected to the said plurality of fuel oil supply pipings. There is provided a sealing connection pipe close to the fuel nozzles in each of the fuel oil supply pipings between the header and fuel nozzles. A purging air supply piping supplies air to each sealing connection pipe, and each sealing connection pipe causes the air from the purging air supply piping to flow toward the fuel nozzles as well as to flow into the fuel oil supply pipings on the opposite side of the fuel nozzles to be discharged from the drain piping.

In the gas turbine fuel oil purge system of the invention of (3) above, the sealing connection pipe and the purging air supply piping are provided close to the fuel nozzles in each of the fuel oil supply pipings and air from the sealing connection pipe is injected from each of the fuel nozzles so that the residual oil only in the very short piping between the sealing connection pipe and each of the fuel nozzles is discharged into the combustor. At the same time, the combustion gas in the combustor is prevented from flowing reversely into the fuel oil supply pipings by the air injected from the fuel nozzles, hence the air so injected has sealing function as well.

During the sealing function, the air also flows from the sealing connection pipe into the fuel oil supply pipings on the opposite side of the fuel nozzles, and after flowing through the fuel oil supply pipings and the drain piping, it is discharged outside of the system. By this flow of air, all the residual oil in the fuel oil supply pipings is discharged outside of the system from the drain piping. According to the invention of (3) above, therefore, when the fuel is changed over to gas from oil and the residual oil in the pipings is to be purged, the residual oil to be injected into the combustor is only the residual oil in the very short piping close to the fuel nozzles and other residual oil is discharged outside of the system from the drain piping. Hence a load change caused by burning of the residual oil is reduced.

(4) A gas turbine fuel nozzle purging air supply system in a gas turbine air system supplies air, extracted from compressor outlet air and cooled at an air cooler, to a rotor as rotor cooling air, as well as supplying air, diverging from the air extracted from compressor outlet air and being elevated in pressure at a pressure elevation compressor, to be used as fuel nozzle purging air. The air cooler comprises a first cooler and a second cooler. Air cooled at the first cooler is used for the rotor cooling air and air diverging from the air cooled at the first cooler is sent to the second cooler to be cooled and then sent to the pressure elevation compressor.

In the gas turbine fuel nozzle purging air supply system of the invention of (4) above, the air cooler comprises the first and second coolers and the air cooled at the first cooler is used as the rotor cooling air to be supplied for rotor cooling. Further, a portion of the air cooled at the first cooler diverges to enter the second cooler to be cooled again, thus the compressor outlet air is cooled to a lower temperature and is led into the pressure elevation compressor. When the air is compressed to a higher pressure at the pressure elevation compressor, its temperature also is elevated, but as the air at the pressure elevation compressor inlet is sufficiently cooled to the lower temperature at the first and second coolers, even if it is elevated in temperature, it can be used as the fuel nozzle purging air without being cooled further.

In the prior art system, air extracted from the compressor outlet air is cooled at a separate cooler and is led into the pressure elevation compressor to be compressed and thus to be elevated in temperature. This air so elevated in temperature is cooled again at another separate cooler to be adjusted to a lower temperature, which is appropriate for the purging air. In the prior art system, therefore, separate coolers are needed and large facilities and space therefor are required. But in the invention of (4) above, the air cooler for the rotor cooling air is made in two units which are used for cooling the purging air as well, separate coolers are not needed, facilities are simplified and cost reduction is attained.

(5) A gas turbine fuel nozzle wash system in a gas turbine wash system comprises a fuel oil supply system for supplying fuel oil to fuel nozzles in a combustor. A compressor wash water supply system supplies wash water to a compressor which supplies compressed air to the combustor. A wash water tank supplies the wash water to the compressor wash water supply system. There are provided a wash water by-pass piping and an opening/closing valve between the fuel oil supply system and the compressor wash water supply system. When the opening/closing valve is opened, the wash water is supplied to the fuel nozzles from the wash water tank via the fuel oil supply system to be injected from the fuel nozzles so that the fuel nozzles are washable.

In the gas turbine fuel nozzle wash system of the invention of (5) above, the wash water by-pass piping and the opening/closing valve are provided between the existing fuel oil supply system and the compressor outlet wash system so that the wash water for compressor washing in the wash water tank is led into the fuel oil supply system. When the fuel is changed over to gas from oil, the oil remains in the fuel nozzles and is carbonized to stick there, which results in a fear of blockage of the fuel nozzles. Hence, when the fuel is changed over to gas, wash water for the compressor washing is led to the fuel nozzles via the wash water by-pass piping and fuel oil supply system to be injected from the fuel nozzles. Thus, the fuel nozzles are washed and a fear of blockage of the nozzles is resolved. Accordingly, the existing pipings are made use of and wash water for the compressor washing is used for nozzle washing as well, whereby facilities cost is reduced and washing of the fuel nozzles with a simple structure becomes possible.

BRIEF DESCRIPTION OF THE DRAWINGS

FIG. 3 is a view showing the relation between load transition (fuel flow rate) and system differential pressure in the fuel oil distribution control system of FIG. 1.

FIG. 4 is a diagrammatic view of the fuel oil purge system of FIG. 1

FIG. 10 is a diagrammatic view of the fuel oil supply system of FIG. 9.

FIG. 14 is a diagrammatic view of the compressor outlet wash system of FIG. 9.

DESCRIPTION OF THE PREFERRED EMBODIMENTS

Figure 1:
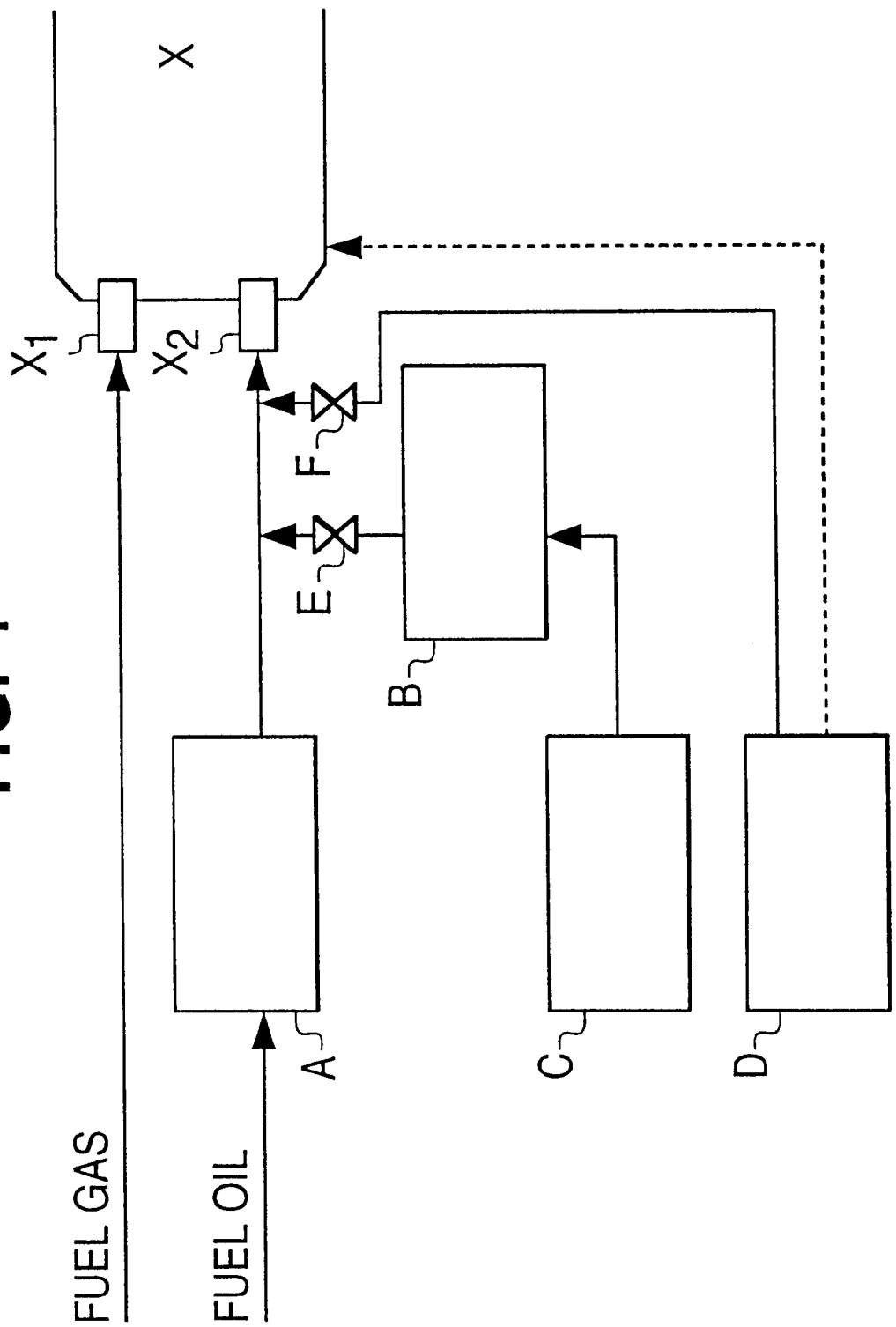
FIG. 1 is a block diagram of an entire gas turbine fuel system comprising a fuel oil distribution control system, a fuel oil purge system, a purging air supply system and a fuel nozzle wash system of one embodiment according to the present invention.
Figure 9:
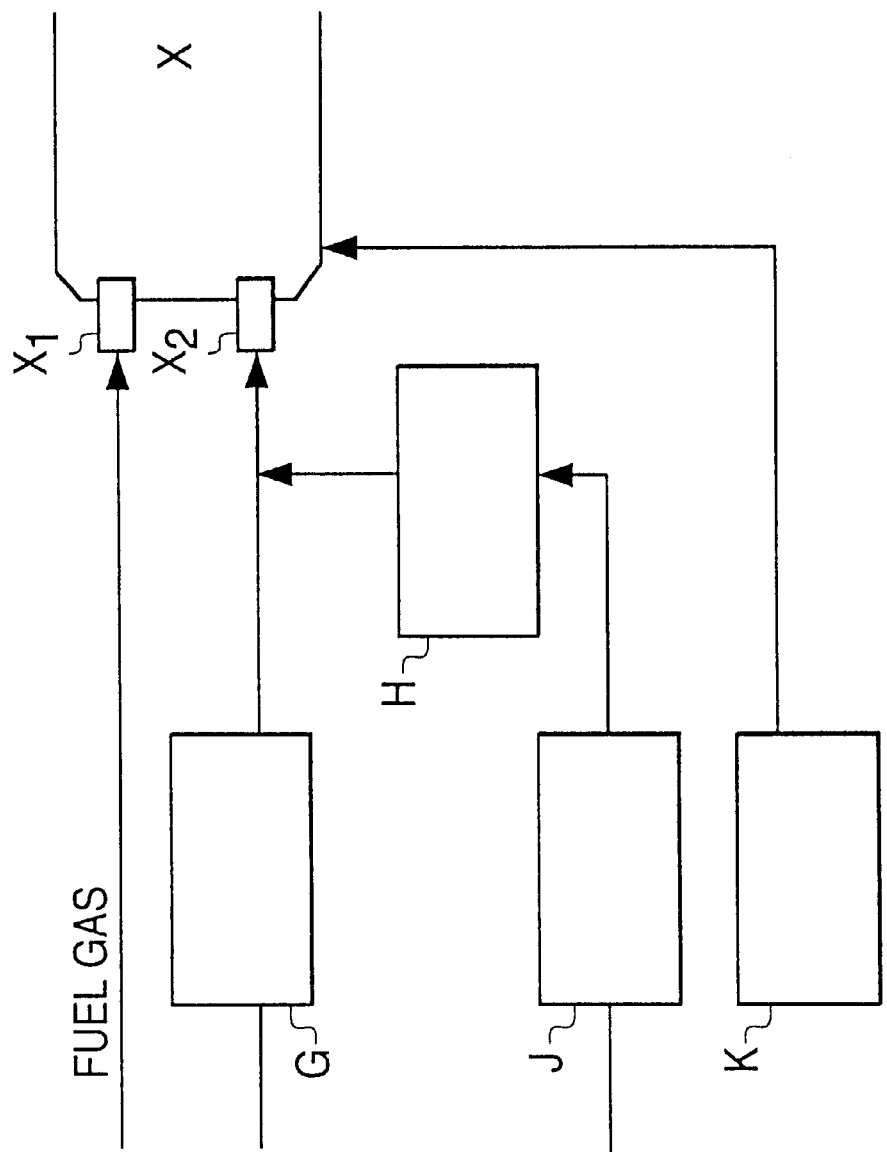
FIG. 9 is a block diagram of an entire gas turbine fuel system comprising a fuel oil supply system, a fuel oil purge system, a purging air supply system and a compressor outlet wash system in the prior art.
Figure 11:
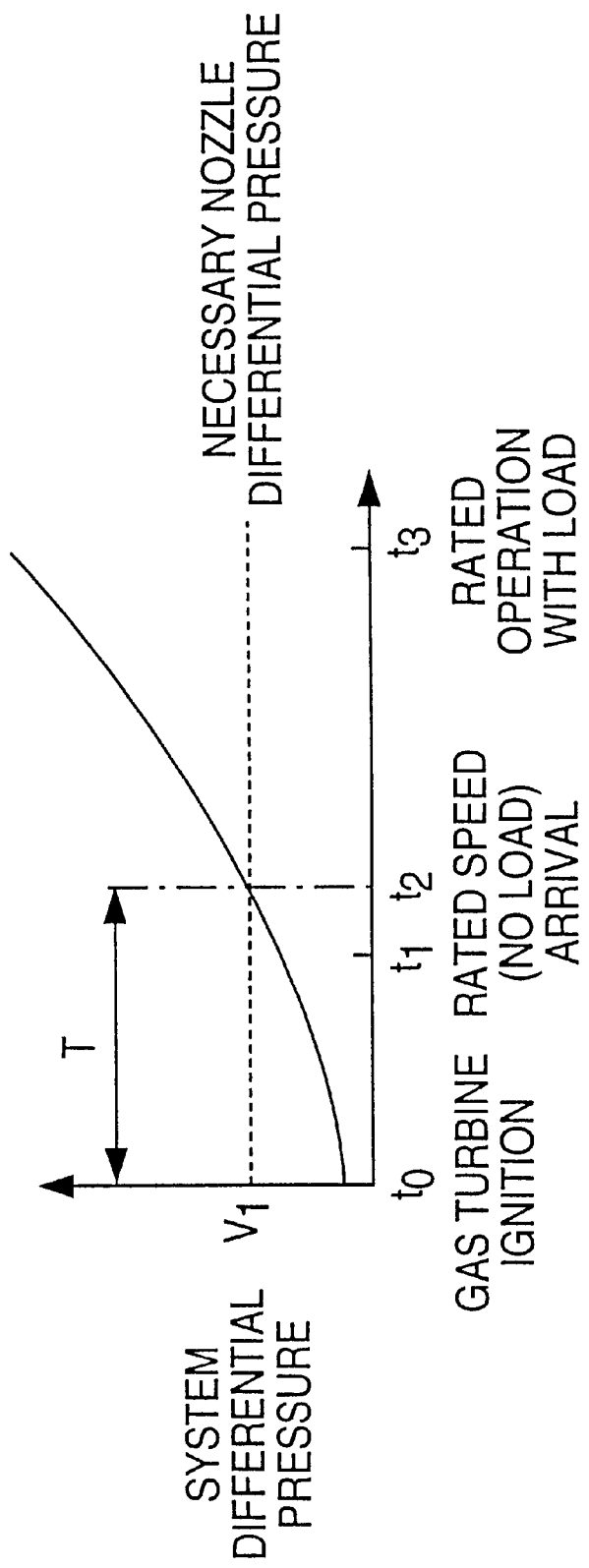
FIG. 11 is a view showing relation between load transition (fuel flow rate) and system differential pressure in the fuel oil supply system of FIG. 9.

Herebelow, description will be made concretely on embodiments according to the present invention with reference to the figures. FIG. 1 is a block diagram of an entire gas turbine fuel system comprising therein a fuel oil distribution control system, a fuel oil purge system, a purging air supply system and a fuel nozzle wash system of one embodiment according to the present invention. FIG. 1 is a view of a block diagram in contrast with that in the prior art of FIG. 9.

In FIG. 1, there are provided in a combustor X a plurality of fuel nozzles $X_1$ and $X_2$, and as in the prior art, fuel nozzles $X_1$ are supplied with fuel gas from a fuel gas supply system and fuel nozzles $X_2$ are supplied with fuel oil from a fuel oil supply system. Letter A designates a fuel oil distribution control system, which corresponds to the fuel oil supply system G of FIG. 9. Letter B designates a fuel oil purge system, which corresponds to the fuel oil purge system H of FIG. 9, letter C designates a purging air supply system, which corresponds to the purging air supply system J of FIG. 9, and letter D designates a fuel nozzle wash system, which corresponds to the compressor outlet wash system K of FIG. 9. Letters E, F designate selector valves, respectively, wherein in the case of air purge, the valve E is opened and the valve F is closed, and in the case of water purge, the valve E is closed and the valve F is opened, reversely. Purging may be done by either one of the air purge and the water purge or by a combination thereof in which the water purge is done first and then the air purge is done.

Figure 2:
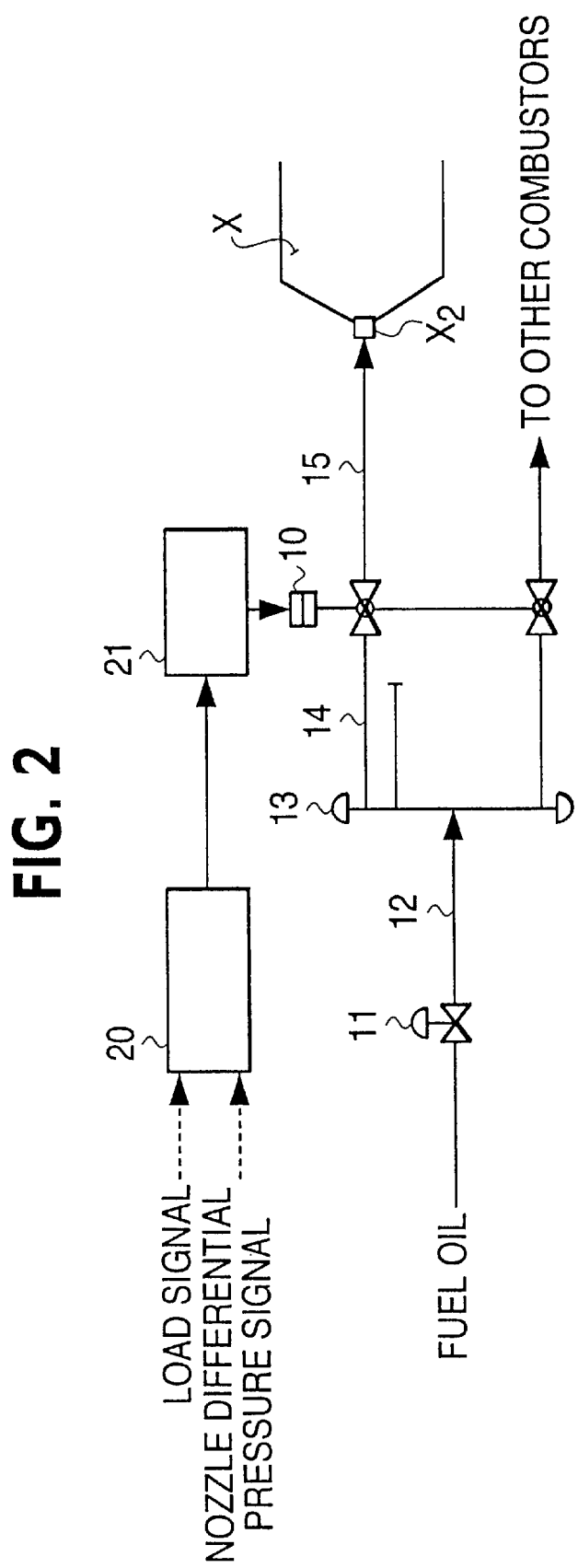
FIG. 2 is a diagrammatic view of the fuel oil distribution control system of FIG. 1.

Description will be made below on each of the mentioned systems. FIG. 2 is a diagrammatic view of the fuel oil distribution control system A of FIG. 1, which is a view of the system in contrast with that in the prior art of FIG. 10. In FIG. 2, parts having same functions as those of the prior art shown in FIG. 10 are given the same reference letters or numerals, with description thereof being omitted. Characteristic portions of the present invention, that is, portions 10 to 14, 20 and 21, will be described in detail.

In FIG. 2, numeral 13 designates a header and numeral 14 designates a plurality of pipings connecting to the header 13. Numeral 10 designates a series control valve, which has a series of control valves in the same number of pieces as that of the fuel nozzles $X_2$ so that each of the valves is controlled at same time with the same opening. That is, if the number of the fuel nozzles $X_2$ is 20, for example, the series control valve 10 is a 20 series control valve. While illustration of the structure of the series control valve 10 is omitted, it is for example such that each of the valves is linked by a link mechanism such as a cylinder and opening of the valves is controlled simultaneously.

Numeral 21 designates a drive unit, which controls opening of the series control valve 10 simultaneously, as mentioned above, and comprises a hydraulic or pneumatic cylinder or an electromotive cylinder or the like. Numeral 20 designates a control unit, which puts out an output signal to the drive unit 21 so that opening of the series control valve 10 may be controlled, as described later.

In the construction as mentioned above, fuel oil passes through a flow control valve 11 and a piping 12 to be led into the header 13 and is then supplied into the respective pipings 14, whose number of pieces is same as that of the fuel nozzles $X_2$. The respective pipings 14 connect to the respective valves of the series control valve 10, and the fuel oil is supplied through the series control valve 10 and pipings 15 to the respective fuel nozzles $X_2$ for combustion in the combustor X.

The series control valve 10 is controlled in valve opening via the drive unit 21 by a signal from the control unit 20, as described later, such that while a nozzle differential pressure is low, the opening is throttled to an intermediate opening, and when the nozzle differential pressure increases in a high fuel flow rate area, the valve is opened fully to make the flow resistance smaller. Thus unusual elevation of the system differential pressure is prevented.

FIG. 3 is a view showing the relation between load transition (fuel flow rate) and the system differential pressure in the fuel oil distribution control system A of FIG. 2. In FIG. 3, while the system differential pressure is lower than the necessary nozzle differential pressure $V_1$ from time $t_0$ when the gas turbine is ignited to time $t_1$ when it arrives at rated speed (no load), the series control valve 10 is throttled to an intermediate opening so that the system differential pressure is elevated higher than the necessary nozzle differential pressure $V_1$, which is shown by broken line in FIG. 3, as the fuel flow rate increases.

At the time $t_1$, the system differential pressure arrives at differential pressure $V_2$, beyond which there may occur an unusually large differential pressure. Then the series control valve 10 is opened fully to make the flow resistance smaller and the system differential pressure is reduced rapidly. Then, at time $t_1'$, the series control valve 10 is throttled again to an intermediate opening. After the time $t_1'$, the system differential pressure goes up again as the fuel flow rate increases, and when it arrives at $V_2$, the series control valve 10 is opened fully again and thereafter the same is repeated so that control is performed.

The system differential pressures $V_1$, $V_2$ are set in the control unit 20 to be stored, and when the control unit 20 is inputted with a gas turbine load signal and a system differential pressure signal, it checks the respective system differential pressures at times $t_0$, $t_1$, and $t'$ in the load transition. When the ignition is performed at $t_0$, a signal to throttle the opening of the series control valve 10 is output to the drive unit 21 so that the opening of the series control valve 10 is throttled to an intermediate level. When the system differential pressure comes to $V_2$, a signal to open the series control valve 10 fully is output to the drive unit 21 so that the valve is opened completely, and the same control is repeated thereafter.

According to the fuel oil distribution control system A as described above, opening of the series control valve 10 is controlled by the control unit 20 and the drive unit 21 so that while the system differential pressure is low for the time of low load after the ignition, opening of the series control valve 10 is throttled to elevate the system differential pressure. Any imbalance in the fuel flow rate due to head differences of the fuel nozzles is resolved thereby. In the high fuel flow rate area, the valve is opened fully and unusual elevation of the system differential pressure is prevented thereby. Thus, a flow divider as in the prior art is not needed fuel oil flow imbalances between each of the fuel nozzles are prevented securely and the reliability is enhanced.

Next, the fuel oil purge system B will be described with reference to FIG. 4. In FIG. 4, parts shown by reference numerals or letters 1 to 4, 11 to 14, 23, X, $X_1$ and $X_2$ are the same as those in the prior art shown in FIG. 12, with description thereof being omitted. Characteristic portions of the present invention, that is parts shown by reference numerals 30 to 33, will be described in detail.

In FIG. 4, numeral 30 designates a purging air system piping, numeral 31 designates an opening/closing valve, numeral 32 designates a plurality of sealing connection pipes and numeral 33 designates a plurality of pipings. Each of the pipings 33 connects at its one end to each of the fuel nozzles $X_2$ and at its other end to each of the sealing connection pipes 32, and the length of each of the pipings 33 is preferably made as short as possible. Also, each of the sealing connection pipes 32 is a T type connection pipe which comprises ports connecting to the pipings 14 and 33 and the purging air system piping 30, respectively.

Thus, the purging air system piping 30 is connected closer to the fuel nozzles $X_2$, as compared with the prior art purging air system piping 26, between the header 13 and the fuel nozzles $X_2$. Hence residual oil in the pipings to be discharged into the combustor X is reduced, as described later.

In the fuel oil purge system B constructed as above, while operation is done with fuel oil, the fuel oil passes through the flow control valve 11 and the piping 12 to enter the header 13 and is distributed there to flow through the plurality of pipings 14 and the sealing connection pipes 32 to then be supplied into the plurality of fuel nozzles $X_2$ via the pipings 33, and is injected into the combustor X for combustion.

When operation is to be with the fuel changed over to gas from oil, the flow control valve 11 is closed and fuel gas is supplied instead through the flow control valve 1, piping 2, fuel gas distributor 3 and piping 4 to enter the respective fuel nozzles $X_1$ to be burned in the combustor X. In this case, there remains the previous fuel oil in the piping 12, header 13, piping 14 and piping 33. If this remaining fuel oil is left there as it is, it is carbonized to stick there. Thus when the fuel oil has been stopped to be changed over to fuel gas, it is necessary to purge the remaining fuel oil while operation is with the fuel gas.

In the case of purging, the opening/closing valve 31 is opened first so that purging air 41 is led into the purging air system piping 30 to flow through one end each of the sealing connection pipes 32 and the piping 33 to enter the fuel nozzles $X_2$. It is then injected into the combustor X from the fuel nozzles to be burned. At same time, the purging air 41 also flows into the piping 14 through the other end each of the sealing connection pipes 32.

Further, the opening/closing valve 24 is also opened to communicate with the drain valve piping 23. Thus, the purging air 41 passes through the purging air system 30, sealing connection pipes 32 and pipings 14, and further through the header 13, piping 12, opening/closing valve 24 and drain valve piping 23, and is discharged outside. By the flow of the purging air 41, the fuel oil remaining in the pipings 33 is discharged into the combustor X and the fuel oil remaining in the pipings 14, header 13 and piping 12 on the opposite side is discharged outside of the system via the drain valve piping 23.

When the purging of the residual oil is to be done while the operation is with fuel gas, as the purging air 41 from the purging air system piping 30 flows through the one end of the sealing connection pipes 32 toward the combustor X to be injected from the fuel nozzles $X_2$, the purging air 41 has a sealing function to prevent reverse flow of the combustion gas from the combustor X. In addition to this sealing function, the purging air 41 causes the residual oil in the pipings 14, header 13 and piping 12 on the opposite side of the sealing connection pipes 32 to be discharged outside of the system from the drain valve piping 23.

Figure 12:
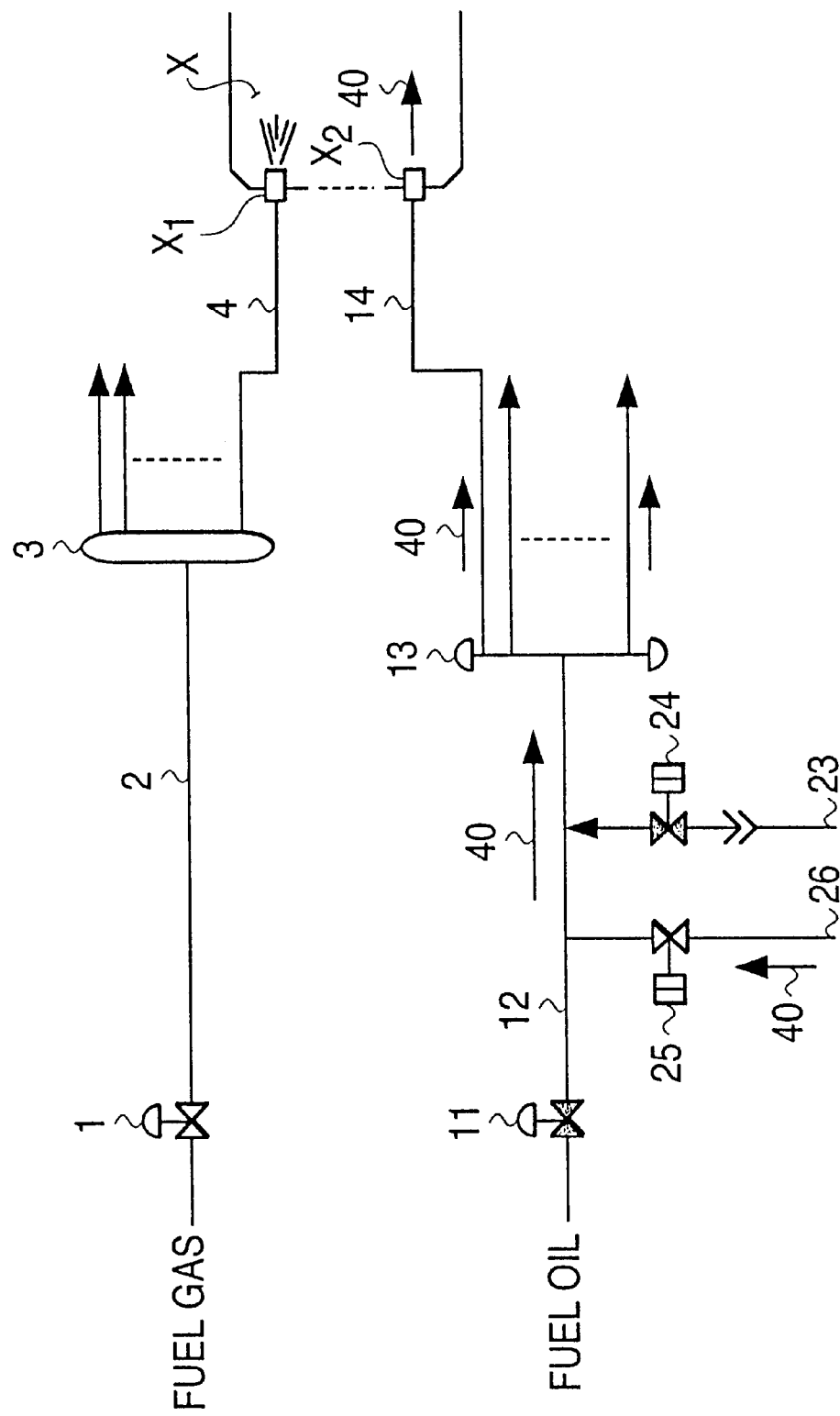
FIG. 12 is a diagrammatic view of the fuel oil purge system of FIG. 9.

In the prior art case shown in FIG. 12, if the opening/closing valve 24 of the drain valve piping 23 is opened during the operation, there may arise a case that the combustion gas from the combustor X is sucked to flow reversely through the pipings 14, header 13 and piping 12 so that the residual oil in the pipings may burn with the high temperature combustion gas to damage the pipings. But in the system of the present invention, the purging air 41 flows from the sealing connection pipes 32 toward the combustor X to be injected from the fuel nozzles $X_2$ so as to seal the combustion gas. Thus the shortcomings in the prior art are prevented.

According to the fuel oil purge system B as described above, the construction is such that the purging air system piping 30 and the sealing connection pipes 32 are connected closer to the fuel nozzles $X_2$ between the pipings 14 and the fuel nozzles $X_2$. The purging air 41 having the sealing function as well is injected from the fuel nozzles $X_2$ so that the residual oil in the pipings 33 is discharged and the combustion gas from the combustor X is prevented from flowing reversely into the pipings 14.

Further, the purging air 41 from the sealing connection pipes 32 flows through the pipings 14, header 13 and piping 12 to be discharged from the drain valve piping 23 so that the residual oil in these pipings is discharged outside of the system from the drain valve piping 23. Thus when the fuel is changed over to gas from oil and residual oil in the pipings is to be purged, the residual oil to be discharged into the combustor X is only that remaining in the short pipings 33. Thus a load change caused by combustion of the residual oil is reduced and a large load change is prevented.

Figure 5:
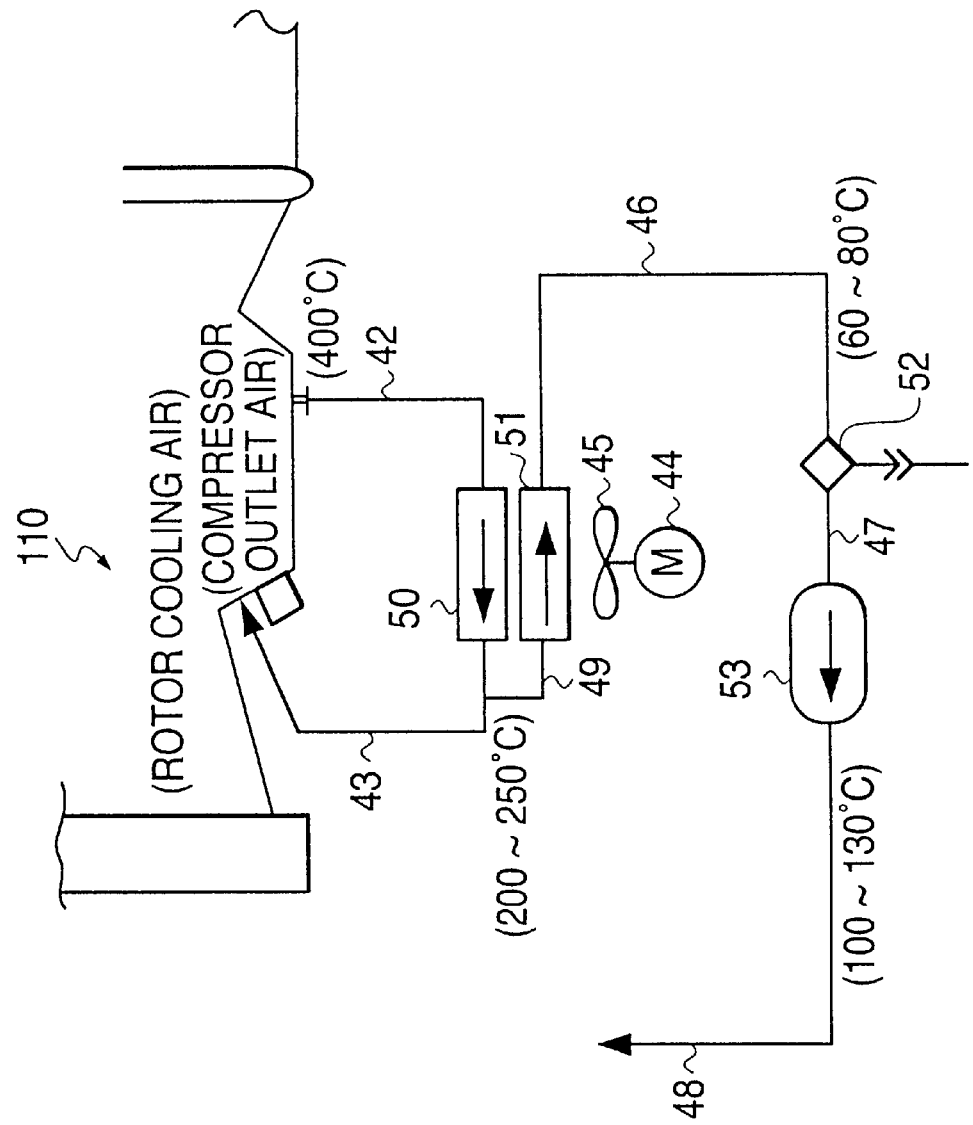
FIG. 5 is a diagrammatic view of the purging air supply system of FIG. 1.

Next, the purging air supply system C will be described with reference to FIG. 5. In FIG. 5, parts shown by reference numerals 110, 42, 43, 48 and 53 are the same as those in the prior art shown in FIG. 13, with description thereof being omitted. Characteristic portions of the present invention, that is, air coolers shown by reference numerals 50, 51 and pipings thereof, as well as an accompanying simplified system, will be described in detail.

In FIG. 5, numeral 50 designates a first air cooler and numeral 51 designates a second air cooler. Both of the air coolers 50, 51 are cooled by air sent from a fan 45 driven by a motor 44. In these air coolers 50, 51, compressor outlet air is led into the first air cooler 50 via the piping 42 and the air, after being cooled, is led from the outlet of the first air cooler 50 into the gas turbine 110 as rotor cooling air via the piping 43. At same time, a portion of the air at the outlet of the first air cooler 50 is extracted to be led into the second air cooler 51 via piping 49.

The air cooled at the second air cooler 51 is led into a drain separator 52 via a piping 46 to be removed of drainage, and is then led into the pressure elevation compressor 53 via a piping 47 to be elevated in pressure and thereby be heated to an appropriate temperature as purging air. Thus, this air is supplied as fuel nozzle purging air via the piping 48.

In the purging air supply system C constructed as above, the compressor outlet air is of about 400° C. and is led into the first air cooler 50 via the piping 42 to be cooled to about 200 to 250° C. by air sent from the fan 45. It is then supplied into the gas turbine 110 as the rotor cooling air as in the prior art.

The air cooled at the first air cooler 50 is of about 200° C. to 250° C. and a portion thereof diverges into the piping 49 to enter the second air cooler 51. The air entering the second air cooler 51 is cooled, as in the first air cooler 50, by air from the fan 45 driven by the motor 44. The air so cooled is of about 60° C. to 80° C. and is led into the drain separator 52 via the piping 46 to be removed of drainage, and then enters the pressure elevation compressor 53 via the piping 47 to be elevated in pressure and thereby be elevated in temperature to about 100° C. to 130° C. This air of about 100° C. to 130° C. is supplied to be used as the fuel nozzle purging air via the piping 48.

According to the purging air supply system C described above, the air cooler for obtaining the rotor cooling air is constructed in two units of the first air cooler 50 and the second air cooler 51. The compressor outlet air of about 400° C. is cooled to about 200° C. to 250° C. at the first air cooler 50 to be used as the rotor cooling air. At the second air cooler 51, the air so cooled to about 200° C. to 250° C. is further cooled to about 60° C. to 80° C.

Figure 13:
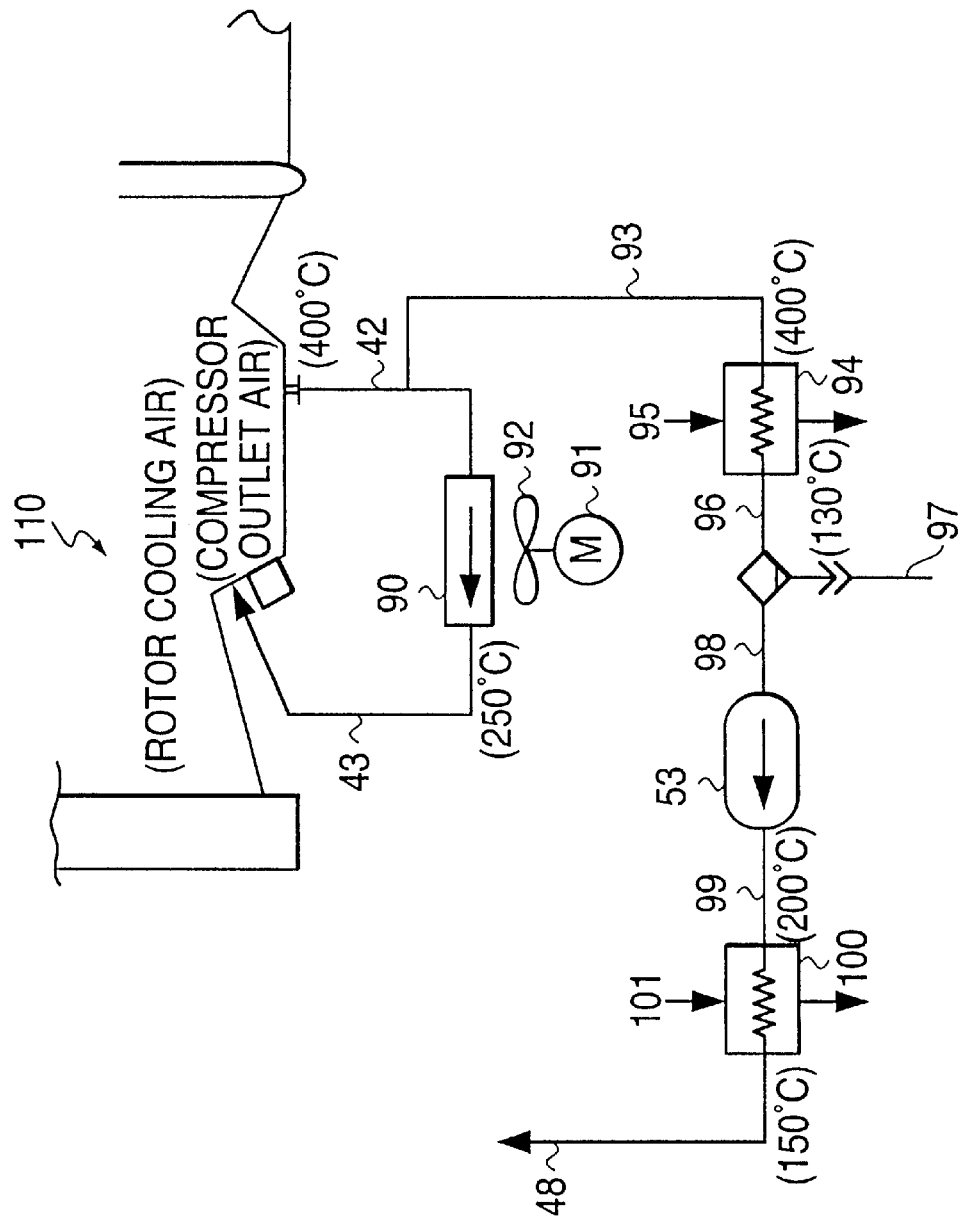
FIG. 13 is a diagrammatic view of the purging air supply system of FIG. 9.

The air so cooled to about 60° C. to 80° C. is used as inlet air of the pressure elevation compressor, hence the air after being elevated in pressure is of a temperature of about 100° C. to 130° C., which is appropriate as the fuel nozzle purging air. In the prior art case as shown in FIG. 13, the air entering the pressure elevation compressor 53, which is the compressor outlet air, is of a high temperature of about 400° C., and hence it is cooled as a first step to about 130° C. at the cooler 94 and is elevated in pressure at the pressure elevation compressor 53. But this air is thereby elevated in temperature to about 200° C., and hence it is cooled again at the cooler 100 for obtaining air of about 150° C.

For this purpose, there are needed the coolers 94, 100, which are large facilities. But in the purging air supply system C of the present invention, the air cooler is made in two units of the first air cooler 50 for obtaining the rotor cooling air and the second air cooler 51 for obtaining the fuel nozzle purging air, whereby the coolers 94, 100 become unnecessary. This results in simplification of the facilities, a reduction of installation space and a reduction of cost.

Figure 6:
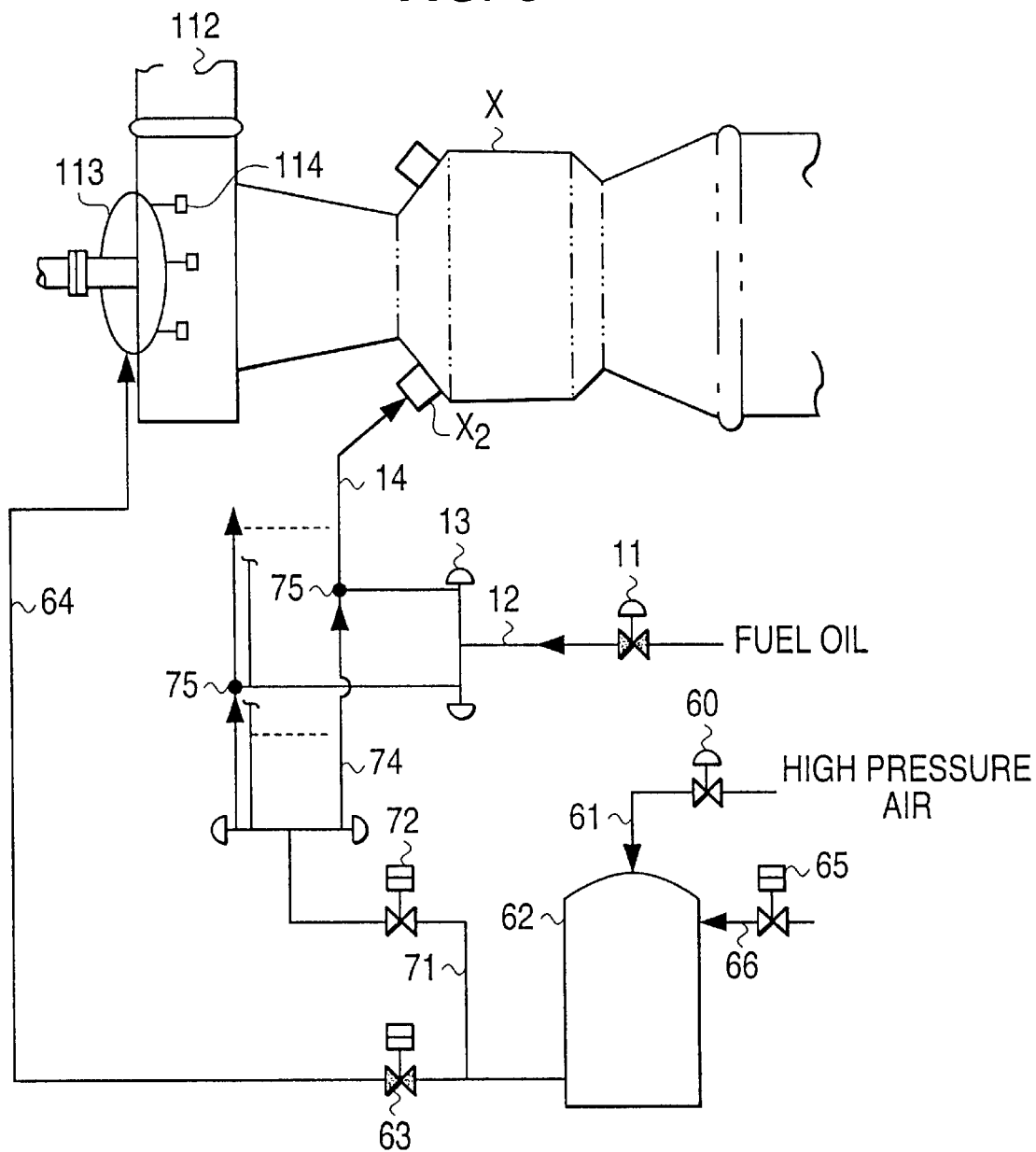
FIG. 6 is a diagrammatic view of the fuel nozzle wash system of FIG. 1.
Figure 7:
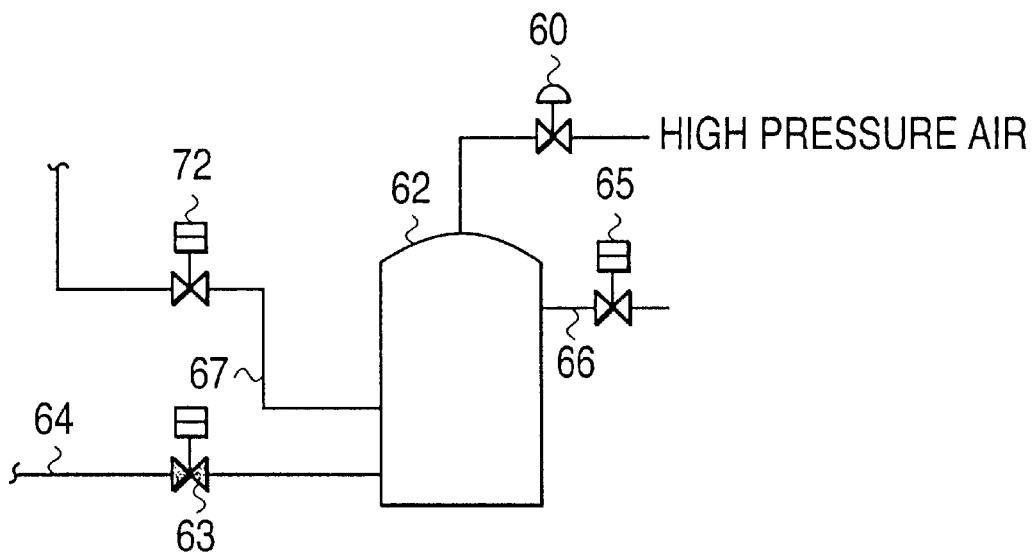
FIG. 7 is a diagrammatic view showing one application example of the fuel nozzle wash system of FIG. 6.
Figure 8:
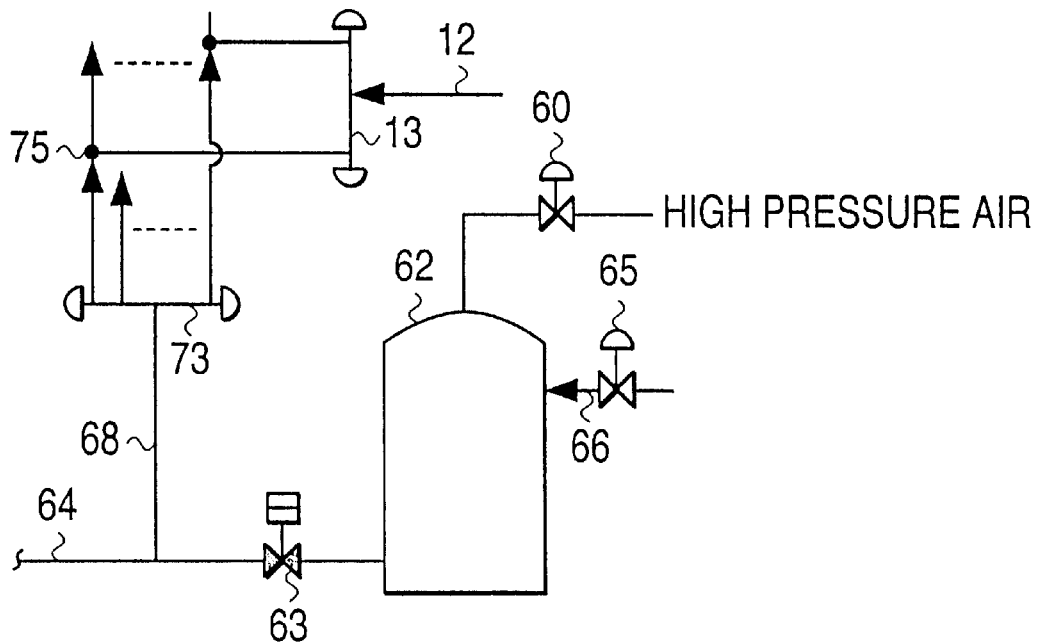
FIG. 8 is a diagrammatic view showing another application example of the fuel nozzle wash system of FIG. 6.

Finally, the fuel nozzle wash system D will be described with reference to FIGS. 6 to 8. In FIGS. 6 to 8, the same parts as those in the prior art shown in FIG. 14 are given the same reference numerals or letters, with description thereof being omitted. Characteristic portions of the present invention, that is, portions shown by reference numerals 71 to 75, will be described in detail.

In FIG. 6, numeral 71 designates a by-pass piping, which connects to the upstream side of the opening/closing valve 63 so that wash water from the wash tank 62 flows therethrough as a by-pass. Numeral 72 designates an opening/closing valve and numeral 73 designates a header for distributing the wash water. Numeral 74 designates a plurality of wash water supply pipings and numeral 75 designates a plurality of connection pipes which are connected to the respective fuel supply pipings 14.

The wash water led from the wash water tank 62 into the header 73 via the by-pass piping 71 is distributed to flow into the respective wash water supply pipings 74 and to further flow into the respective fuel supply pipings 14 via the connection pipes 75, and then enters the respective fuel nozzles $X_2$.

In the fuel nozzle wash system D constructed as above, when the fuel nozzles $X_2$ are to be washed, the flow control valve 11 is closed, the opening/closing valve 63 is also closed, the opening/closing valve 72 is opened and the air control valve 60 is opened. Thus, high pressure air is led into the wash water tank 62 to pressurize the wash water in the tank so that the wash water is led into the header 13.

The wash water is distributed at the header 13 to flow into the respective wash water supply pipings and further to flow into the respective fuel supply pipings 14 via the connection pipes 75 and is then injected into the combustor X from the respective fuel nozzles so that residual oil in the fuel nozzles $X_2$ is washed and removed. The water containing the residual oil injected from the fuel nozzles $X_2$ is thus discharged into the combustor X and is vaporized by the high temperature there.

FIG. 7 is a diagrammatic view showing one application example of the fuel nozzle wash system D of the present invention. In FIG. 7, what is different from that shown in FIG. 6 is that the by-pass piping does not diverge from the piping 64 of the compressor wash system, but is connected directly to the wash water tank 62. The opening/closing valve 72 is provided in this by-pass piping 67, so that the fuel nozzle wash system is made as a separate system from the compressor wash system. Construction of the other portions of FIG. 7 is the same as that of FIG. 6. In the application example shown in FIG. 7, the same function and effects of the invention as those of the wash system shown in FIG. 6 can be obtained.

FIG. 8 is a diagrammatic view showing another application example of the fuel nozzle wash system D of the present invention. In FIG. 8, what is different from that shown in FIG. 6 is that the by-pass piping is connected to the downstream side of the opening/closing valve 63 of the compressor wash system. In this system of FIG. 8, the compressor wash system and the fuel nozzle wash system are operated at the same time by the single opening/closing valve 63, wherein the opening/closing valve 72 shown in FIGS. 6 and 7 is eliminated. Construction of the other portions of FIG. 8 is the same as that of FIGS. 6 and 7. In the application example shown in FIG. 8, the same function and effects of the invention as those of the wash system shown in FIGS. 6 and 7 can be obtained.

According to the fuel nozzle wash systems D shown in FIGS. 6 and 7, the construction is such that there are provided the by-pass pipings 71, 67 for conducting therethrough the wash water from the wash water tank 62 of the compressor outlet wash system in a by-pass. The wash water flows through the header 73, wash water supply pipings 74 and connection pipes 75 to the respective fuel supply pipings 14, and is then supplied into the fuel nozzles $X_2$ for washing the residual oil in the fuel nozzles $X_2$. Also, according to the fuel nozzle wash system D shown in FIG. 8, the construction is such that the piping 64 of the compressor outlet wash system and the piping 68 of the fuel nozzle wash system are connected to the wash water tank 62 via the single opening/closing valve 63. Thus, by these constructions, washing of the fuel nozzles $X_2$ can be done by the wash water from the wash water tank 62 of the compressor outlet wash system, and no exclusive wash apparatus of the fuel nozzles $X_2$ is needed. Hence the wash system can be made in a simple piping structure, which contributes to cost reduction of the gas turbine plant.

It is understood that the invention is not limited to the particular construction and arrangement herein illustrated and described but embraces such modified forms thereof as come within the scope of the appended claims.

What is claimed is:

1. A purging air supply system comprising:
   a first cooler that cools air from a rotor of a gas turbine, said first cooler comprising a first inlet and a first outlet, said first inlet being in communication with the rotor so as to receive air from the rotor, said first outlet being in communication with the rotor so as to outlet a first portion of cooled air to the rotor;

a second cooler that further cools a second portion of the cooled air from said first cooler, said second cooler comprising a second inlet and a second outlet, said second inlet being in communication with said first outlet so as to receive the second portion of the cooled air from said first cooler; and a pressure elevation compressor that increases pressure of further cooled air from said second cooler, said pressure elevation compressor comprising a third inlet and a third outlet, said third inlet being in communication with said second outlet so as to receive the further cooled air from said second cooler, said third outlet being in communication with a fuel nozzle of the gas turbine so as to supply air at an increased pressure to the fuel nozzle.

2. The purging air supply system of claim 1, further comprising a cooling fan that cools said first cooler and said second cooler.

3. The purging air supply system of claim 1, wherein said first cooler cools air from the rotor of the gas turbine to a temperature of at least 200° C.

4. The purging air supply system of claim 1, wherein said first cooler cools air from the rotor of the gas turbine to a temperature not greater than 250° C.

5. The purging air supply system of claim 1, wherein said second cooler cools the second portion of the cooled air from said first cooler to a temperature of at least 60° C.

6. The purging air supply system of claim 1, wherein said second cooler cools the second portion of the cooled air from said first cooler to a temperature not greater than 80° C.

7. The purging air supply system of claim 1, wherein said pressure elevation compressor supplies the air at an increased pressure at a temperature of at least 100° C.

8. The purging air supply system of claim 1, wherein said pressure elevation compressor supplies the air at an increased pressure at a temperature not greater than 130° C.

9. The purging air supply system of claim 1, further comprising a drain separator arranged so as to remove drainage from the second portion of the cooled air from said first cooler.

10. The purging air supply system of claim 9, wherein said drain separator is in communication with said second cooler.

11. The purging air supply system of claim 10, wherein said drain separator is additionally in communication with said pressure elevation compressor.

* * * * *